March 21, 1944.　　G. H. DROEGKAMP　　2,344,605
DENTAL TOOL
Filed April 15, 1942
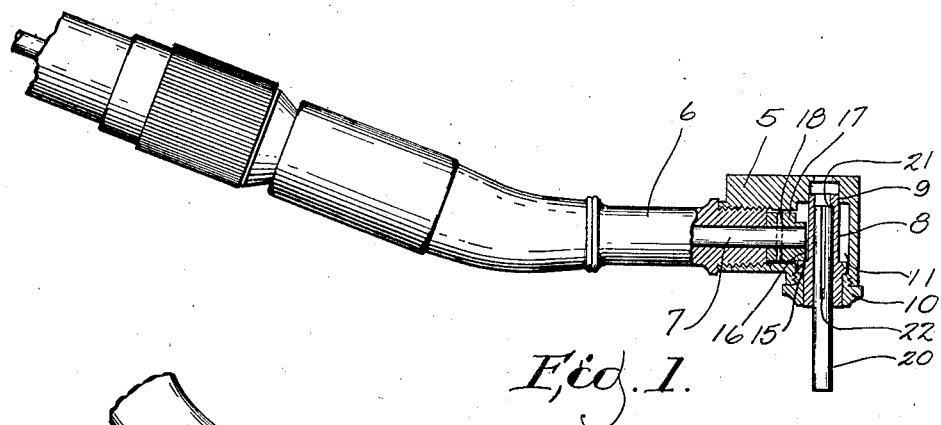
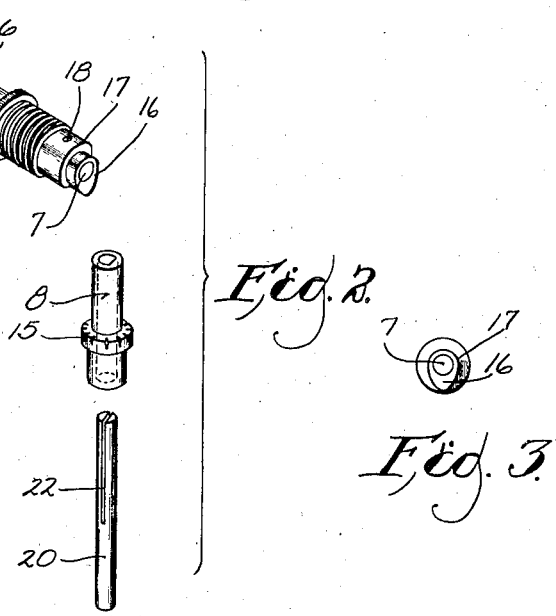
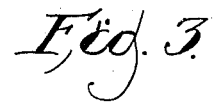
INVENTOR
GILBERT H. DROEGKAMP.
BY
Wheeler, Wheeler & Wheeler
ATTORNEYS.

Patented Mar. 21, 1944

2,344,605

UNITED STATES PATENT OFFICE 2,344,605

DENTAL TOOL

Gilbert H. Droegkamp, Wauwatosa, Wis.

Application April 15, 1942, Serial No. 439,069

5 Claims. (Cl. 32—54)

This invention relates to improvements in dental tools.

It is the primary object of the invention to provide a novel and improved tamping tool attachment for dental engines which is light, compact, resembles in form and shape the contra-angle with which dentists everywhere are familiar, and is more practicable than tamping tools previously available.

More specifically, it is an important object of the invention to provide a dental plugger or tamping tool which comprises simple and inexpensive parts applicable as substitute parts in a conventional contra-angle for the conversion thereof from rotary to reciprocative motion.

Another object of the invention is to provide a construction in which the tool sleeve may be rotated as well as reciprocated to vary the surfaces exposed to wear during the use of the device.

Other objects will be apparent to those skilled in the art from the following disclosure of the invention.

In the drawing:

Figure 1 is a view largely in side elevation but partially in section of a contra-angle converted for the purposes of the present invention, the drawing illustrating the parts at substantially twice their normal size.

Figure 2 shows in perspective the several driving and driven parts constituting the invention.

Figure 3 is a further enlarged view in end elevation of the driving collar and cam.

Like parts are identified by the same reference characters throughout the several views.

As previously indicated, the invention contemplates the conversion of a conventional contra-angle which has a head portion 5 to which the shank portion 6 is threaded to provide a bearing for the drive shaft 7.

In the original contra-angle, the burr sleeve 8 was rotatable, being provided with a fixed bearing at 9 in the head 5 and a lower bearing in the removable nut 10 closing the bottom of the gear chamber 11. Integral with the burr sleeve was a bevel pinion driven by a complementary pinion mounted at the end of the drive shaft 7.

For the purposes of the present invention, the burr sleeve 8 is removed and its bevel pinion teeth are ground off to a radial plane, leaving a flat surfaced collar 15 in which vestiges of the spaces between the original teeth are preferably allowed to remain, as clearly shown both in Figure 1 and Figure 2.

From the end of the drive shaft 7, the driving pinion is now removed and a cam is substituted. The cam 16 is mounted integrally at the end of a collar 17 secured by means of pin 18 to drive shaft 7. The integral piece comprising the collar and cam is the only part which I am obliged to substitute. I have found it convenient to make this part from a short section of drill rod or other tool steel, as it should be very hard. It is particularly to be noted that the overall radius of the cam is no greater than that of the collar 17 and the collar is of less diameter than the screw threads on the shank 6. This permits the collar and cam to be assembled on the end of shaft 7 and the whole assembly to be inserted unitarily into the head 5 in operative relation to the flange 15 on the burr sleeve 8 which now serves the function of a cam follower.

The level to which flange 15 is ground is such as to permit the nose of cam 17 to clear the flange when the sleeve is at its lowest level, as shown in Figure 1. The pressure of the tool upon the work is sufficient to return the sleeve when the nose of the cam passes from the point of collar engagement. Not much movement is necessary. In actual practice, the burr sleeve only has about one millimeter of reciprocative movement.

The plugger point 20 may be of any desired shape and may be serrated or smooth, according to the work to be done. The point shown is, therefore, purely illustrative. Instead of going clear through the burr sleeve and projecting beyond the top of the head 5, like the burrs originally provided for use in a conventional contra-angle, the plugger point terminates at the shoulder 21 in the burr sleeve and is held in the sleeve by friction, the upper end of the plugger point being deeply slotted at 22.

The slight grooves remaining in the face of cam follower flange 15 following the grinding off of the teeth are not only permissible but desirable, as the rotation of cam 16 causes a very slight angular displacement of the burr sleeve in each operation, thus bringing a fresh surface of the cam follower beneath the cam at substantially every cam rotation. In practice, the change which results in reciprocative rather than rotative movement of the burr sleeve does not result in any increase of wear either of the drive shaft and its bearings, or the head, or the burr sleeve. In all respects, the tool satisfies the objectives of the invention as above specified.

Because there is neither a spring return nor a positive return of the tool carrier sleeve (the return depending on engagement of the tool with the work), there is no wear whatever upon the device nor even any engagement of the cam with the follower flange until the tool actually rests upon the work. Moreover, the effect of the tool upon the work can be varied by varying the pressure of engagement of the tool with the work. Thus, the cam may in a sense be regarded rather as a hammer than as a cam in the conventional sense, since the stroke of the cam follower is not determined by the radius of the cam but may be, in fact, less than the cam radius and determined in part by the pressure of the tool on the work and in part by the range in movement afforded the sleeve in the head. These considerations are all desirable in minimizing wear and enabling a skilled dentist to have accurate control of the operations in a sense impossible in pluggers previously available.

I claim:

1. A dental tool comprising the combination with a contra-angle head having a downwardly opening chamber and a closure therefor provided with a downwardly opening bearing, of a tool carrying sleeve reciprocably and rotatably disposed in the bearing of said closure and provided immediately above the closure with a cam follower flange extending about its periphery, a shank screw-threaded into said head substantially at right angles to the sleeve and provided with a bearing, a drive shaft rotatable in the last mentioned bearing, and a cam mounted on the end of the drive shaft in operative position for engagement with the flange at one side of the sleeve, said cam being bodily receivable into the head in assembly with said shaft.

2. The device of claim 1 in combination with a plugger point having a longitudinally slotted shank portion frictionally engaged in the sleeve.

3. The combination with a contra-angle head having an internal chamber and a bottom closure therefor provided with a bearing, of a sleeve rotatable and reciprocable in the bearing and provided with a peripheral flange immediately above the closure and having a roughened upper surface, said contra-head having a threaded socket opening from said chamber substantially at right angles to said sleeve, a shank screw-threaded to said head and disposed in said socket and provided with a shaft bearing, a drive shaft rotatable in the shaft therein, a collar on the end of the shaft of no greater a diameter than the threaded portion of the shank, whereby to be receivable bodily with the shaft and shank into the head, a cam carried by the collar and disposed in operative relation to said flange in a position offset with respect to the center of the sleeve, said cam having its maximum radius no greater than the maximum radius of the threaded portion of the sleeve, and said cam being operable upon said flange to produce both rotative and reciprocative movement of the sleeve.

4. The device of claim 3 in which the sleeve has an internal bore terminating in a shoulder and is provided with a plugger point in said bore in abutment with the shoulder, said plugger point having an axially extending diametrically extending slot extending almost the total length of the sleeve for providing sufficient resilience to maintain the plugger point releasably in the sleeve.

5. A dental tool having a head provided with a gear chamber and a closure at the bottom of the gear chamber threaded to the head and provided with a bearing, said head also having a threaded socket opening to the gear chamber and a vent opening extending upwardly from the gear chamber, a tool carrier sleeve having a radially grooved annular flange intermediate its ends, said sleeve having sliding and rotative bearing in the closure and in the upper end of the head, a plugging tool removably mounted in the sleeve, a shank member screw-threaded into the socket of the head and provided with a drive shaft bearing, a drive shaft in the bearing, and a cam and mounting collar at the end of the drive shaft, said collar being connected with the drive shaft and having said cam integral therewith and disposed in the chamber in operative relation to said flange at one side of the sleeve for the rotation of the sleeve and its reciprocation in one direction, said sleeve being free to be returned in the other direction by pressure of the work upon the tool, the cam and collar being bodily receivable into said socket in operative assembly on said shaft at the end of said shank.

GILBERT H. DROEGKAMP.